United States Patent
Yuyama

(10) Patent No.: US 10,426,706 B2
(45) Date of Patent: Oct. 1, 2019

(54) MEDICINE DISPENSING DEVICE

(71) Applicant: YUYAMA MFG. CO., LTD., Osaka (JP)

(72) Inventor: Shoji Yuyama, Osaka (JP)

(73) Assignee: YUYAMA MFG. CO., LTD., Osaka (JP)

(*) Notice: Subject to any disclaimer, the term of this patent is extended or adjusted under 35 U.S.C. 154(b) by 121 days.

(21) Appl. No.: 15/322,723

(22) PCT Filed: Jun. 26, 2015

(86) PCT No.: PCT/JP2015/068487
§ 371 (c)(1),
(2) Date: Dec. 28, 2016

(87) PCT Pub. No.: WO2016/002650
PCT Pub. Date: Jan. 7, 2016

(65) Prior Publication Data
US 2017/0135905 A1    May 18, 2017

(30) Foreign Application Priority Data
Jul. 1, 2014 (JP) ................................. 2014-135846

(51) Int. Cl.
*B65B 57/20* (2006.01)
*A61J 7/00* (2006.01)
(Continued)

(52) U.S. Cl.
CPC ............ *A61J 7/0076* (2013.01); *B65B 57/00* (2013.01); *B65B 61/025* (2013.01); *G06K 9/78* (2013.01);
(Continued)

(58) Field of Classification Search
CPC .......... A61J 7/0076; G06K 9/78; H04N 7/183
See application file for complete search history.

(56) References Cited

U.S. PATENT DOCUMENTS 8,020,356 B2 * 9/2011 Yuyama ................. B65B 5/103
53/168
8,245,483 B2   8/2012 Yuyama et al.
(Continued)

FOREIGN PATENT DOCUMENTS

EP    2256703 A1    12/2010
JP    5-337168 A    12/1993
(Continued)

OTHER PUBLICATIONS

International Search Report in International Application No. PCT/JP2015/068487, dated Sep. 15, 2015.

*Primary Examiner* — Howard D Brown, Jr.
(74) *Attorney, Agent, or Firm* — Hauptman Ham, LLP

(57) ABSTRACT

A medicine dispensing device includes: a plurality of medicine cassettes; a manual distribution medicine supply device; a printing means for printing a dosing information of included in a prescription data on a packing paper; a packing means for packing the medicine dispensed from the medicine cassette or the manual distribution medicine supply device one pack at a time based on the prescription data; a rotation means for rotating the medicine before the medicine is packed into the packing paper; an imaging means for imaging the medicine rotated by the rotation means together with an identification portion; and a control means for performing an inspection process by reading the identification portion from the medicine imaged by the imaging means, extracting a medicine information based on the read identification portion, and comparing the extracted medicine information with a medicine information included in the prescription data.

10 Claims, 15 Drawing Sheets

(51) Int. Cl.
*G06K 9/78* (2006.01)
*H04N 7/18* (2006.01)
*B65B 57/00* (2006.01)
*B65B 61/02* (2006.01)
*G07F 17/00* (2006.01)

(52) U.S. Cl.
CPC ......... *G07F 17/0092* (2013.01); *H04N 7/183* (2013.01); *B65B 2210/04* (2013.01)

(56) References Cited

U.S. PATENT DOCUMENTS

| | | | |
|---|---|---|---|
| 8,256,187 | B2 | 9/2012 | Yuyama et al. |
| 8,997,441 | B2 | 4/2015 | Yuyama et al. |
| 9,299,212 | B2 * | 3/2016 | Amano ................... G07F 11/44 |
| 9,542,533 | B2 * | 1/2017 | Patel ................... G06F 19/3462 |
| 9,994,347 | B2 * | 6/2018 | Yuyama ................ G06T 7/0004 |
| 2013/0026174 | A1 * | 1/2013 | Yuyama ................... G07F 11/00 |
| | | | 221/2 |
| 2013/0255831 | A1 * | 10/2013 | Shibasaki ................. A61J 1/00 |
| | | | 141/69 |
| 2013/0342676 | A1 * | 12/2013 | Amano .................... H04N 7/18 |
| | | | 348/86 |
| 2014/0058561 | A1 * | 2/2014 | Rothschild ................ A61J 1/03 |
| | | | 700/244 |
| 2016/0022912 | A1 * | 1/2016 | Hernandez .............. A61M 5/14 |
| | | | 604/506 |
| 2016/0114925 | A1 * | 4/2016 | Yuyama ................ G06T 7/0004 |
| | | | 382/141 |
| 2017/0301087 | A1 * | 10/2017 | Yuyama .................... A61J 3/00 |
| 2018/0046776 | A1 * | 2/2018 | Chalifoux ............... G16H 40/67 |

FOREIGN PATENT DOCUMENTS

| | | |
|---|---|---|
| JP | 4034404 B2 | 1/2008 |
| JP | 2008-62945 A | 3/2008 |
| JP | 4439433 B2 | 3/2010 |
| JP | 2011-104077 A | 6/2011 |
| WO | 2011/027694 A1 | 3/2011 |

* cited by examiner

FIG. 5A

| 3 DOSES FOR 7 DAYS | MORNING | DAYTIME | EVENING |
|---|---|---|---|
| MEDICINE A ( O ) | 1 | 2 | 1 |
| MEDICINE B ( △ ) | 1 | 1 | 1 |
| MEDICINE C ( □ ) | 2 | 1 | 1 |
| TOTAL | 4 | 4 | 3 |

FIG. 5B

| | FIRST DAY | SECOND DAY | THIRD DAY | FOURTH DAY | FIFTH DAY | SIXTH DAY | SEVENTH DAY |
|---|---|---|---|---|---|---|---|
| MORNING (4) | O | O | O | O | O | O | O |
| | △ | △ | △ | △ | △ | △ | △ |
| | □ | □ | □ | □ | □ | □ | □ |
| | □ | □ | □ | □ | □ | □ | □ |
| DAYTIME (4) | O | O | O | O | O | O | O |
| | O | O | O | O | O | //—// | O |
| | △ | △ | △ | △ | △ | △ | △ |
| | □ | □ | □ | □ | □ | □ | □ |
| | | | | | | | //O// |
| EVENING (3) | O | //—// | O | O | O | O | O |
| | △ | △ | △ | △ | △ | △ | △ |
| | □ | □ | □ | □ | □ | □ | □ |
| | | | //O// | | | | |

MEDICINE DISPENSING DEVICE

CROSS-REFERENCE TO RELATED APPLICATIONS

This application is a 35 U.S.C § 371 national stage filing of International Application No. PCT/JP2015/068487, filed on Jun. 26, 2015, which claims the benefit of Japanese Patent Application No. 2014-135846, filed on Jul. 1, 2014, the entire contents of each of which are incorporated by reference herein.

TECHNICAL FIELD

The present invention relates to a medicine dispensing device having a function of inspecting a medicine.

BACKGROUND

There exists in the art a medicine dispensing device which images a medicine before packing the medicine into a packing paper and then inspects the medicine, and a medicine dispensing device which images the medicine after packing the medicine and then inspects the medicine.

In the former, for example, as disclosed in Patent Document 1, only tablets needed to be inspected are supplied to a turntable, and are imaged by a camera, and are then transferred from a discharge hopper via a transfer conveyor, and thereafter are packed one pack at a time by a packing device.

In the latter, for example, as disclosed in Patent Document 2, packed tablets are imaged by an imaging device while being illuminated by an illumination device, and the number of the tablets is counted from a negative image.

However, in the configuration disclosed in Patent Document 1, there is no disclosure as to a structure for inverting the tablet. Thus, when an engraved information is not formed on a front surface of the transferred medicine, but on a back surface of the medicine, the engraved information cannot be read.

Further, in the configuration disclosed in Patent Document 2, tablets are photographed under a state where a packing paper is interposed between the tablets and the imaging device. Thus, it is impossible to read an engraving or the like formed on a surface of the tablet. Further, there is a concern in that imaging cannot be performed properly due to overlapping tablets.

Patent Document 1: Japanese Patent No. 4034404
Patent Document 2: Japanese Patent No. 4439433

SUMMARY

It is an object of the present invention to reliably perform an inspection of a medicine before packing.

As a means for achieving the aforementioned object, the present invention provides a medicine dispensing device including: a plurality of medicine cassettes for dispensably receiving a medicine or a manual distribution medicine supply device having a plurality of cells to which a medicine is distributed; a printing means for printing a dosing information included in a prescription data on a packing paper; a packing means that is supplied with the packing paper printed by the printing means and packs the medicine dispensed from the medicine cassette or the manual distribution medicine supply device one pack at a time based on the prescription data; a reading means for reading an identification portion from the medicine dispensed from the medicine cassette or the manual distribution medicine supply device before the medicine is packed into the packing paper by the packing means; and a control means for performing an inspection process based on a medicine information included in the prescription data.

According to this configuration, it is possible to read the identification portion such as an engraving formed on the medicine by the reading means before the step of packing the medicine into the packing paper. Also, it is possible to perform the inspection process based on the read identification portion and the medicine information of the prescription data, thereby reliably performing the inspection.

It is preferable that the reading means includes a rotation means for rotating the medicine to bring the identification portion into a state where the identification portion can be imaged, and an imaging means for imaging the medicine rotated by the rotation means together with the identification portion.

According to this configuration, the medicine itself is rotated by the rotation means. Thus, although the medicine is under a state where the identification portion cannot be imaged before the medicine is packed into the packing paper, the medicine can be forced to be brought into a state where the identification portion can be imaged. Since it suffices that the medicine is rotated, the mechanism does not become complicated and the present invention can be freely applied to an existing apparatus.

The medicine dispensing device includes a storage means that stores a medicine information including the identification portion formed on the medicine received in each of the medicine cassettes. The control means performs the inspection process by reading the identification portion from the medicine imaged by the imaging means, extracting relevant medicine information from the storage means based on the read identification portion, and comparing the extracted medicine information with the medicine information included in the prescription data. However, the identification portion read directly from the medicine may be directly compared with an identification portion as the medicine information included in the prescription data.

It is preferable that the medicine dispensing device further includes a display means for displaying an image data of the medicine imaged by the imaging means, and that the control means allows the image data of the medicine imaged by the imaging means to be displayed by the display means such that the image data of the medicine imaged by the imaging means is distinguishable per a pack unit for packing to the packing paper.

According to this configuration, it is possible to determine whether the medicine is proper per the pack unit depending on the displayed contents. Thus, checking the inspection result can be easily performed under an easily distinguishable state.

It is preferable that the control means rearranges the image data of the medicine displayed by the display means in a predetermined order of medicine type.

According to this configuration, the displayed image data of the medicine is always displayed in a determined order, thereby making it easier to observe the image data and making it easier to check the inspection result.

It is preferable that a path from the medicine cassette or the manual distribution medicine supply device to the packing means is formed as a closed space, and that the imaging means is disposed in the closed space.

According to this configuration, the closed space is formed between the medicine supplying source and a location where the medicine is packed into the packing paper, and the medicine which is an object to be inspected can be imaged in the closed space. Therefore, it is possible to reliably prevent intrusion of foreign substances from the outside, thereby improving reliability of the inspection and packing.

It is preferable that the medicine dispensing device further includes a separation means allowing the medicine from the medicine cassette or the manual distribution medicine supply device to be supplied one by one to a position where the medicine is imaged by the imaging means.

According to this configuration, it is possible to perform reliable imaging of the medicine to be packed, one by one.

It is preferable that the medicine dispensing device includes an illuminating means for illuminating the medicine at a position where the medicine is imaged by the imaging means, and that the illuminating means is comprised of a light emitting part, a light guide part guiding the light from the light emitting part to an outer periphery of an imaging position, and a reflecting part guiding the light from the light guide part to an inner periphery toward the imaging position.

According to this configuration, although a plurality of rotation means for rotating the medicine are provided, it is possible to use one imaging means in common. In addition, it is possible to properly image the medicine by means of the light guide part and the reflecting part without generating halation.

It is preferable that the rotation means includes a pair of juxtaposed rollers and a drive means synchronizing both of the rollers and rotating both of the rollers in the same direction.

According to this configuration, it is possible to rotate the medicine irrespective of the size thereof despite simplicity and inexpensiveness, and it is possible to perform reliable imaging of the identification portion of the medicine by the imaging means.

According to the present invention, it is possible to conduct a reliable reading of the identification portion and perform the inspection by rotating and imaging the medicine before packing the medicine.

BRIEF DESCRIPTION OF THE DRAWINGS

FIG. 5A is a table showing one example of a prescription data according to the present embodiment.

FIG. 5B shows an example of an inspection result screen which is displayed after performing a medicine inspection process based on the prescription data shown in FIG. 5A.

DETAILED DESCRIPTION

Figure 1:
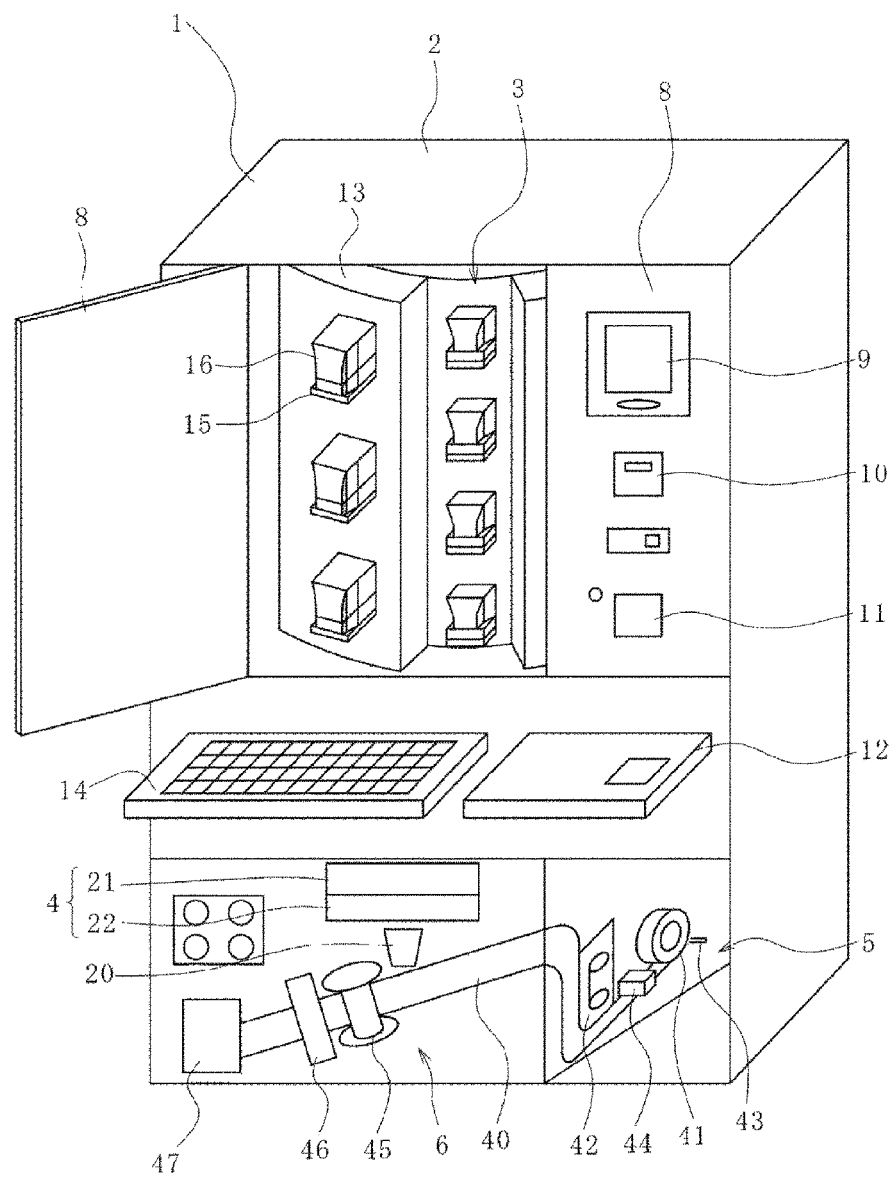
FIG. 1 is a schematic view showing a medicine dispensing device according to the present embodiment.

Hereinafter, descriptions are made with reference to the accompanying drawings as to embodiments of the present invention. The terms indicating specific directions or positions (e.g., the terms including "upper", "lower", "side", "end") are used in the descriptions made below, when necessary. Those terms are used for easy understanding of the invention referring to the drawings. The technical scope of the present invention is not limited by the meaning of those terms. Further, the descriptions made below are only illustrative, and are not intended to limit the present invention, applications thereof or use thereof. Further, the drawings are schematical and a scale of each dimensions therein differ from a practical scale.

FIG. 1 shows a medicine packing device 1 according to the present embodiment. This medicine packing device 1 includes, in a device body 2, a medicine supply unit 3, a medicine inspection unit 4, a printing unit 5, a packing unit 6 and a control unit 7 (see FIG. 4).

Hinged doors 8 are installed at an upper portion of the device body 2, and medicine cassettes 16 can be attached to and detached from the medicine supply unit 3 disposed in the device body. A touch panel 9, a bar code reader 10 and a journal printer 11 are installed on one of the doors 8 (a right door in FIG. 1). Further, a replenishment table 12 and a manual distribution medicine supply part 14, which will be described below, are installed in the device body 2 below the doors 8.

The medicine supply unit 3 includes an automatic medicine supply part 13 and the manual distribution medicine supply part 14.

The automatic medicine supply part 13 is configured such that motor bases 15 are installed on a generally cylindrical cylinder in vertical and circumferential directions and the medicine cassettes 16 can be attached to and detached from the respective motor bases 15. The details of the motor base 15 are not shown in the figure. The motor base is configured to house a motor therein and to transmit power to a rotor of the medicine cassette 16 through gears. Further, the automatic medicine supply part 13 is provided with medicine passages (not shown) for the respective columns of the medicine cassettes 16 that are disposed in the vertical direction. The medicines dispensed from the medicine cassettes 16 are smoothly guided downward by those medicine passages. A counting sensor (not shown) for detecting the number of tablets of the dispensed medicines is installed at a portion of the medicine passage which communicates with a discharge opening of the medicine cassette.

The medicine cassette 16 has a generally rectangular box shape, and the same type of medicines managed by a lot number are received in the medicine cassette. A rotor (not shown) is installed in the medicine cassette 16 and a plurality of pocket portions are formed in an outer periphery of the medicine cassette. Each pocket portion retains one of the medicines 17 received in the medicine cassette 16. The rotor is rotated by a drive force transmitted from a motor provided in the motor base 15 through gears. As the rotor is rotated, the medicines 17 retained in the pocket portions are sequentially dispensed to the medicine passage.

Figure 4:
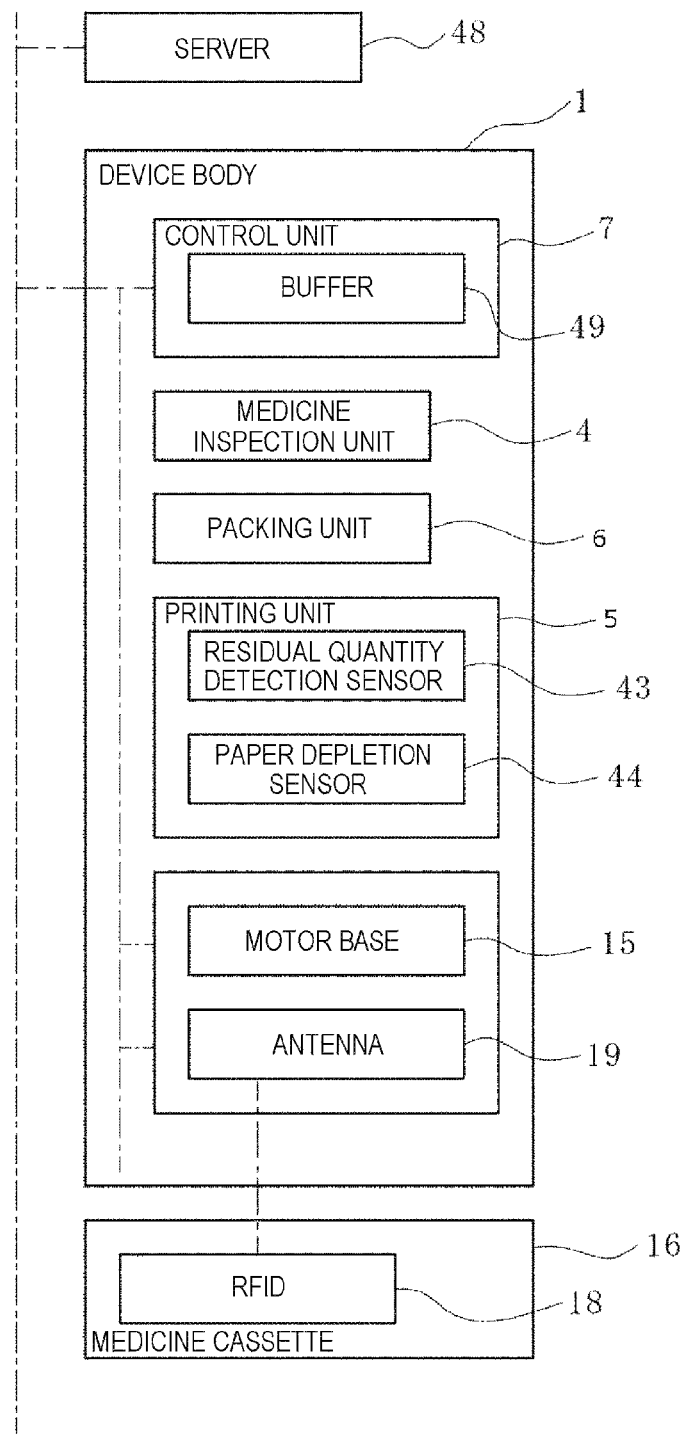
FIG. 4 is a block diagram of the medicine dispensing device according to the present embodiment.

As shown in FIG. 4, an RFID (Radio Frequency IDentification) 18 is provided at each of the medicine cassettes 16. Information on the medicine 17 to be received (medicine information such as a medicine name, the number of received medicines, etc.) is stored in the RFID. An antenna 19 is provided at each of the motor bases 15 to enable the motor base to communicate with the RFID 18 of the medicine cassette 16. Dispensing information of the medicine 17 (a quantity of dispensed medicines 17, a stock quantity of the medicines remaining in the medicine cassette 16, an identification number of a shelf to which the medicine cassette 16 is mounted, etc.) is read out from the RFID 18 through the antenna 19 and is then stored in a buffer 49 of the control unit 7 which is described below.

Medicines 17 that cannot be automatically dispensed (for example, half-tablets, etc.) are manually distributed to respective cells of the manual distribution medicine supply part 14, which are formed in a grid shape as shown in FIG. 1 (a manual dispensing operation). The manual distribution medicine supply part dispenses the medicines to a medicine separation part 21 of the medicine inspection unit 4 by sequentially opening bottoms of the cells. Further, instructions on which medicine 17 is manually distributed to which location are printed by the journal printer 11 based on prescription data. By way of example, a medicine or medicines for one dosage are manually distributed to the respective cells of the manual distribution medicine supply part 14.

The medicine inspection unit 4 is comprised of the medicine separation part 21 and a medicine imaging part 22.

Figure 2A:
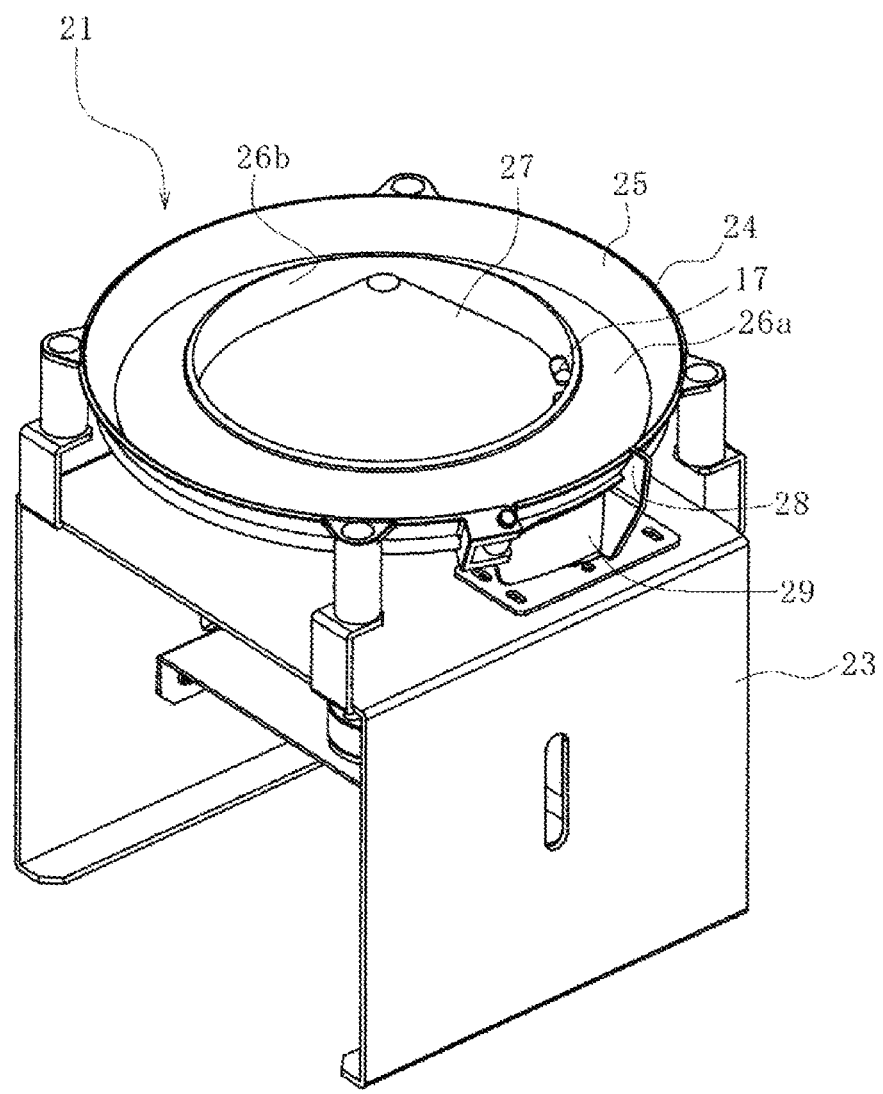
FIG. 2A is a perspective view of a medicine separation part constituting a medicine inspection unit shown in FIG. 1.

The medicine separation part 21 is comprised of a support 23 and a receiving saucer member 24 for the medicine 17 disposed on the support 23, for example, as shown in FIG. 2A.

The receiving saucer member 24 includes an outer peripheral portion 25, a rotating plate 26a disposed at an inner periphery of the outer peripheral portion, a cylindrical portion 26b disposed at an inner periphery of the rotating plate, and a conical portion 27 disposed at an inner periphery of the cylindrical portion. Each of the rotating plate 26a, the cylindrical portion 26b and the conical portion 27 can be independently, normally and reversely rotated by a drive mechanism (not shown) provided in the support 23. The cylindrical portion 26b and the conical portion 27 can be intermittently rotated.

The outer peripheral portion 25 is formed such that its inner peripheral surface is an inclined surface gradually inclined downwardly from an outer peripheral edge toward the interior. Further, a cutout 28 is formed at a portion of the outer peripheral portion 25, and the cutout 28 can be opened and closed by a shutter 29. By opening the shutter 29, the medicine 17 (a tablet, a capsule or the like which has a fixed shape and has an identification portion 17a (an engraving or a print) on an outer surface thereof) can be discharged to the medicine imaging part 22 through the cutout 28. The identification portion 17a indicates the medicine type. The medicine 17 discharged through the cutout 28 is detected by a sensor (not shown).

The rotating plate 26a has a donut shape and its upper surface thereof is formed in a conical shape gradually inclined downwardly toward its outer periphery. The rotating plate 26a forms a transfer space in which the medicine 17 is transferred in a circumferential direction at the outer peripheral portion 25.

An upper end of the cylindrical portion 26b is inclined so as to form a portion of a conical surface together with the upper surface of the rotating plate 26a. The cylindrical portion 26b functions as a bearing for the rotating plate 26a and the conical portion 27, and stabilizes a rotational state of both the rotating plate and the conical portion. Further, the cylindrical portion 26b guides lifting and lowering motions of the conical portion 27.

The conical portion 27 is formed in a conical shape such that its upper surface gradually protrudes upwardly toward a center. As described above, the conical portion 27 is not only normally and reversely rotated by the drive mechanism but also can be lifted and lowered by a drive mechanism (not shown). At a lifted position, the upper surface of the conical portion 27 coincides with the upper surface of the rotating plate 26a and the upper end of the cylindrical portion 26b, thus forming the same conical surface. Further, at a lowered position, the conical portion 27 forms an alignment space, in which the medicines 17 are temporarily standby and can be aligned, by the upper surface of the conical portion and an inner peripheral surface of the cylindrical portion 26b.

Figure 2B:
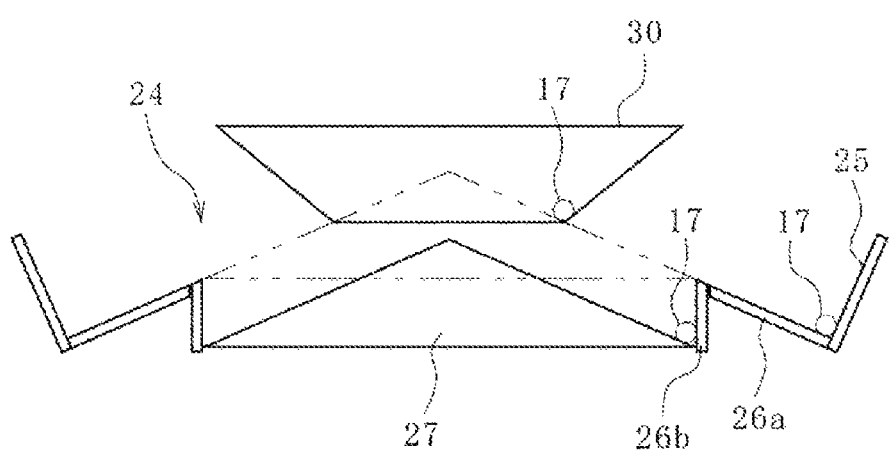
FIG. 2B is a schematic front view enlarging a receiving saucer member shown in FIG. 2A.

As shown in FIG. 2B, a donut-shaped assistance guide 30 is disposed above the medicine separation part 21. The assistance guide 30 is formed in a conical shape that is gradually inclined downwardly toward a center hole. When the assistance guide 30 is placed on the conical portion 27 positioned at the lifted pos 0 the assistance guide forms a retention space, in which the supplied medicine 17 can be temporarily retained, between the upper surface of the conical portion 27 and the assistance guide.

In the medicine separation part 21 configured as described above, the medicine 17 is supplied to the retention space which is formed in a state where the conical portion 27 is positioned at the lifted position and the assistance guide 30 is disposed on the conical portion 27. Then, if the conical portion 27 is lowered, all of the supplied medicines 17 are transferred to the alignment space formed by the upper surface of the conical portion 27 and the inner peripheral surface of the cylindrical portion 26b. In this state, if the conical portion 27 and the cylindrical portion 6b are rotated normally and reversely respectively in opposite directions in synchronization with each other, then the medicines 17 are subjected to frictional resistances in opposite rotational directions from the conical portion and the cylindrical portion. Thus, the medicines are aligned in a row along the inner peripheral surface of the cylindrical portion. Subsequently, if the conical portion 27 is lifted to the lifted position, the retention space is eliminated and the medicines 17 retained in the retention space are moved to the transfer space located in a radially outward direction. The transfer space is located from the retention space in the radially outward direction and its circumference is elongated. Thus, spacings between the aligned medicines 17 are widened in the transfer space. If the rotating plate 26a is rotated in such a state, the medicines 17 are transferred in the circumferential direction. Thereafter, if the shutter 29 is opened, then the medicines are sequentially transferred to the medicine imaging part 22 through the cutout 28 one tablet by one tablet.

Figure 3A:
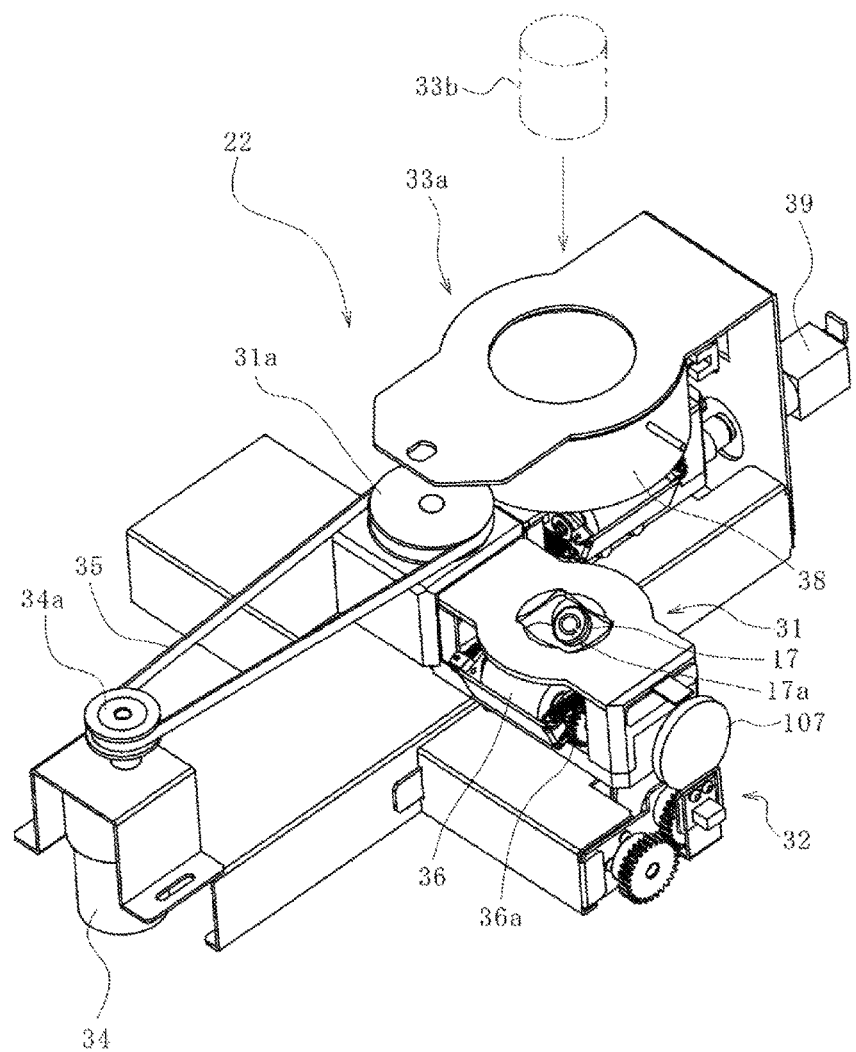
FIG. 3A is a perspective view of a medicine imaging part constituting the medicine inspection unit shown in FIG. 1.

As shown, for example, in FIG. 3A, the medicine imaging part 22 includes medicine holding parts 31 which are equi-spaced to four locations around a central shaft and can be rotated around the central shaft (the medicine holding parts located at two locations are not shown in FIG. 3A). Further, in the medicine imaging part 22, a medicine discharging part 32 is disposed at a lower side of one of the four locations, and a medicine illuminating part 33a and a camera 33b for imaging medicines are disposed at an upper side of another location.

A pulley 31a is integrated with the central shaft for the four medicine holding parts 31. A belt 35 is wound around and between the pulley 31a and a pulley 34a integrated with a rotating shaft of a motor 34. The medicine holding parts 31 are configured to be rotated by 90 degrees at a time by driving of a motor 4. Further, the medicine holding part 31 includes a pair of rotating rollers 36 which are rotated in synchronization with each other and can come into and out of contact with each other.

Figure 3B:
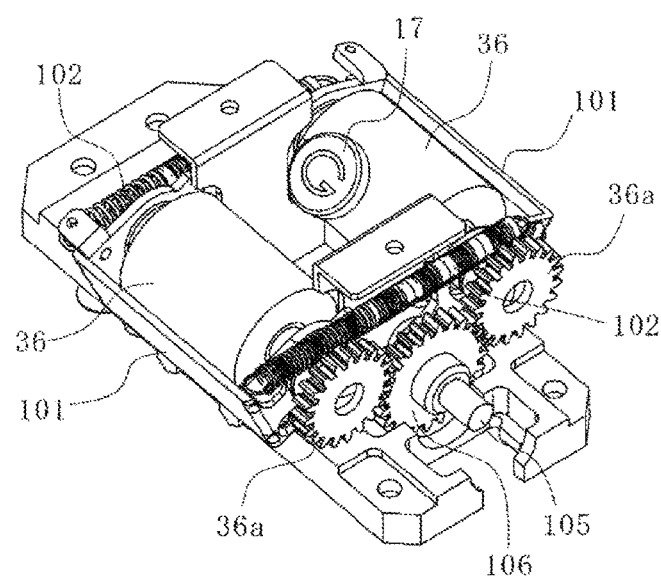
FIG. 3B is a partially enlarged perspective view showing a portion of a medicine holding part shown in FIG. 3A.
Figure 3C:
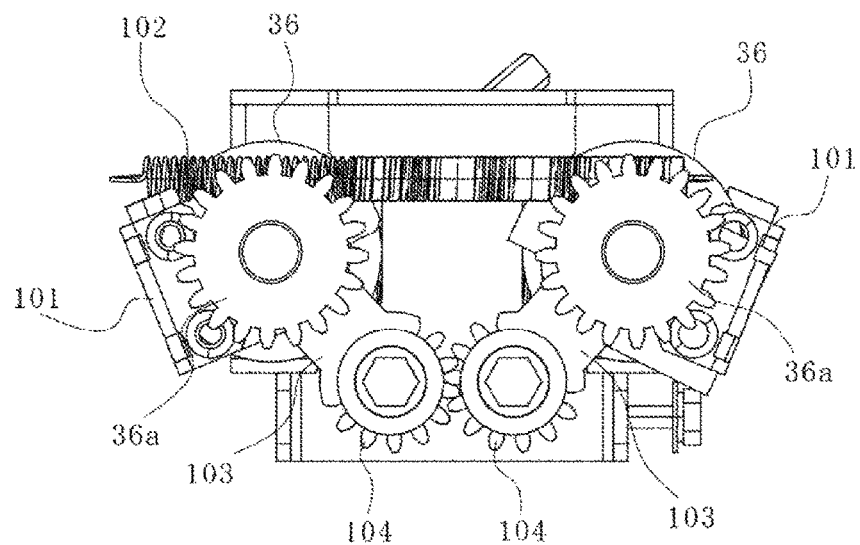
FIG. 3C is a front view of FIG. 3B.

As shown in FIGS. 3B and 3C, a rotating shaft of each of the rotating rollers 36 is rotatably supported at both ends of a support plate 101. The support plates 101 are installed so as to come into and out of contact with each other and are biased by a spring 102 so as to approach each other. Further, arms 103 extend from ends of the support plates 101, respectively, and gears 104 are provided at leading ends of the arms so as to be in mesh with each other. Thus, in a normal state, the rotating rollers approach each other to support the medicine 17. The rotating rollers 36 synchronously come into and out of contact with each other due to the action of the meshing gears 104. The rotating rollers 36 rotatably support the medicine 17 in a state where the rotating roller are in contact with or approach each other, and drop the supported medicine 17 in a state where the rotating rollers are spaced from each other.

Further, a driven gear 36a is integrated with one end of the rotating shaft of each rotating roller 36. A drive gear 106 integrated with one end of a drive shaft 105 is in mesh with both the driven gears 36a. A driven roller 107 is integrated with the other end of the drive shaft 105. The driven roller 107 comprises a magnet gear. When the medicine holding part 31 is rotated to a position corresponding to the medicine illuminating part 33a, a drive force of a drive motor 39 can be transmitted to the driven roller through a magnet gear disposed immediately below and spaced from the driven roller. Therefore, the drive force of the drive motor 39 is transmitted to the rotating rollers 36, and both of the rotating rollers 36 are synchronously rotated in the same direction.

The medicine discharging part 32 includes an elevation mechanism (not shown) for lifting and lowering the drive shaft 105. When the drive shaft 105 is moved to a lifted position, a gap between the driven gears 36a is widened by the drive gear 106. The driven gears 36a are integrated with both ends of the rotating shafts of the rotating rollers 36. As described above, the rotating shaft of the rotating roller 36 is rotatably supported by the support plate 101. The support plates 101 are synchronously pivoted due to the gears 104 meshing with each other. Thus, the rotating rollers 36 are equally moved away from each other toward lateral sides, and the medicine 17 supported by the rotating rollers is dropped and discharged through a gap defined between the rotating rollers.

The medicine illuminating part 33a includes a plurality of LEDs (not shown) disposed at an upper side and a cylinder-shaped light guide member 38 disposed below the LEDs. Light outputted from the LEDs passes through the light guide member 38 and is directed downwardly and then irradiates the interior by a reflective plate (not shown). Further, the medicine illuminating part 33a is provided with the drive motor 39 to apply a rotational force to the rotating rollers 36 of the medicine holding part 31. The rotating rollers 36 are synchronously rotated in the same direction to rotate the medicine placed thereon. This enables the medicine to be in a state where the identification portion 17a such as an engraving or print formed on the medicine 17 is clearly visible from above.

The camera 33b images the medicine 17, which are rotated to a position corresponding to the medicine illuminating part 33a, from the above. The light outputted from the LEDs and radiated from above is guided by the light guide member 38 and the reflective plate and then illuminates the medicine 17. Thus, the medicine 7 can be clearly imaged by the camera 33b.

As such, the medicine 17 can be illuminated by the medicine illuminating part 33a provided only at one location with respect to the rotating medicine holding parts 31 located at four locations, and then can be imaged. Thus, there is no need for installing a plurality of expensive medicine illuminating parts 33a or cameras 33b, thereby enabling inexpensive manufacture. Further, since the light from the LEDs can be reliably guided by the light guide member 38 and the reflective plate, the illumination state for the medicine 17 can become suitable for imaging.

As shown in FIG. 1, the printing unit 5 includes a roll 41 around which a bifold packing paper 40 is wound, and a printer 42 which prints the name of the medicine 17, dosage instructions or the like on a surface of the packing paper 40 unwound from the roll 41 based on inputted prescription data. A residual quantity of the packing paper 40 wound around the roll 41 is detected by a residual quantity detection sensor 43, and a residual quantity signal is transmitted to the control unit 7. Further, a paper depletion sensor 44 is provided on the way of a conveyance path of the packing paper 40 unwound from the roll 41 to detect a depletion occurrence of the packing paper 40 and transmit a depletion signal to the control unit 7.

The packing unit 6 includes heater rollers 45 disposed at both lateral sides of the packing paper 40 which is obliquely conveyed from above toward below. The heater rollers 45 are rotated and pack the medicines one pack at a time while conveying the packing paper. At an upstream side of the heater rollers 45 with respect to the conveyance direction of the packing paper 40, a lower opening of a hopper 20 is disposed between the bifold packing paper 40 which is being conveyed (hereinafter, this position is referred to as a medicine discharge position). Further, a cutter 46 is installed at a downstream side of the heater rollers 45 with respect to the conveyance direction of the packing paper 40 so that the packing paper 40 can be cut by a desired number of packs. Further, at a downstream side of the cutter 46 with respect to the conveyance direction of the packing paper 40, a conveyor 47 is installed to convey the cut packing paper 40 to a removal position.

As shown in FIG. 4, the control unit 7 transmits and receives signals to and from a server 48 in which a plurality of prescription data are stored, and accumulates commands from the server 48 into a buffer 49. The control unit drives and controls the automatic medicine supply part 13 (the medicine cassette 16) or the manual distribution medicine supply part 14 according to the commands, thus dispensing a corresponding medicine 17. Further, at the same time, the control unit drives and controls the packing unit 6 such that the dosing information on the medicine 17 to be dispensed is printed on the packing paper 40, and the control unit drives the packing unit 6 such that the packing unit packs the medicines 17 one dosage by one dosage. Further, as described below, the control unit allows an inspection result from the medicine inspection unit 4 to be displayed on the touch panel 9, as described below. Further, a data table consisting of medicine information (medicine names, medicine codes, usage, efficacy, medicine images, identification portions provided on the surfaces of medicines, etc.) other than the prescription data is stored in a memory part of the server 48. Those may be stored in a memory part of the control unit 7.

Next, descriptions are made as to the operation of the medicine packing device 1 configured as described above. Herein, the medicine inspection process that is a feature of the present invention and is performed before packing of medicines are mainly described.

The medicine supplied from the medicine supply unit 3 or the manual distribution medicine supply part 14 reaches the medicine inspection unit 4 through the passage (not shown). In the medicine inspection unit 4, first at the medicine separation part 21, the medicine 17 supplied from the medicine supply unit 3 is temporarily retained in the retention space formed by the conical portion 27 and the assistance guide 30.

If the assistance guide 30 is lifted and the conical portion 27 is moved to the lowered position, then the retention space is eliminated and the medicine 17 is transferred to the alignment space formed by the conical portion 27 and the cylindrical portion 26b. In this state, the conical portion 27 and the cylindrical portion 26b are rotated normally and reversely in the opposite directions in synchronization with each other. Therefore, the medicines 17 in the alignment space are intermittently subjected to the frictional resistances in the opposite rotational directions from contact surfaces with the conical portion 27 and the cylindrical portion 26b, and thus are aligned in a row the circumferential direction along the inner peripheral surface.

After sufficient time for the medicines 17 to become aligned in a row after the start of the rotation of the conical portion 27 and the cylindrical portion 26b, the conical portion 27 is moved again to the lifted position. Therefore, the alignment space is eliminated, and the medicines 17 aligned in a row are moved in the radially outward direction as they are. Then, the medicines reach the outer periphery of the rotating plate 26a surrounded by the outer peripheral portion 25. Since the medicines are moved to the outer peripheral portion having the elongated circumference, the medicines 17 aligned in the alignment space are aligned in a row in the circumferential direction under the state where the spacings between the medicines are further widened in the circumferential direction.

As the rotating plate 26a is rotated, the medicines 17 are moved in the circumferential direction. Thus, when the shutter 29 is opened, the medicines 17 are sequentially transferred to the medicine imaging part 22 one by one through the cutout 28. Herein, a sensor detects the discharge of the medicines 17 through the cutout 28, and the rotation of the rotating plate 26a is momentarily paused whenever one of the medicines 17 is discharged. Accordingly, it is possible to reliably discharge the medicines 17 one by one.

In the medicine imaging part 22, whenever one of the medicines is supplied to the medicine holding part 31, the medicine holding part 31 is rotated by 90 degrees. When the medicine holding part 31 reaches the medicine illuminating part 33a, the magnet gear of the medicine holding part and the magnet gear of the motor approach each other and the drive force of the drive motor 39 can be transmitted to the rotating rollers 36 in a non-contact state. Thus, the medicine is photographed by the camera 33b while the medicine 17 is rotated by rotating the rotating rollers 36. In other words, where the shape of the medicine 17 is a capsule shape or sphere shape, the medicine 17 is photographed while being rotated. Where the shape of the medicine 17 is a disc shape, the medicine 17 is photographed while being inverted (reversed). Therefore, the identification portion 17a is made visible from above, and the imaging process for the medicine can be performed by the camera 33b.

Further, the light outputted from the LEDs passes through the light guide member 38 and is reflected in a radially inward direction by the reflective plate to illuminate the medicine 17. In this state, when the medicine 17 is imaged by the camera 33b, it is possible to illuminate the medicine with desired brightness while suppressing the reflected light from the medicine 17 (halation).

In this way, the identification portion 17a is reliably read from the medicine 17 one at a time by the camera 33b. Then, the corresponding medicine information is read from the data table stored in the memory part of the server 48 or the like, based on the read identification portion 17a. Further, the medicine information on the medicine to be packed at this time is extracted, and the medicine inspection process of comparing the extracted medicine information with the read medicine information. If both of the medicine informations are matched as a result of the comparison, this means that the medicine 17 is properly dispensed. Thus, the medicine 17 is transferred to the packing unit 6 as it is, and is then packed one dosage at a time. On the other hand, if both of the medicine informations are not matched, this means an error, and an image inspection result is displayed as an output screen on the touch panel 9.

Further, the image inspection result may be displayed although no error occurs. Further, the medicine imaging performed by the imaging part may be performed several times for one medicine 17, and such images of the medicine may be outputted as the inspection result. By way of example, respective images of the front and back surfaces for one medicine 17 may be outputted as an imaging result.

When the image inspection result is displayed on the touch panel 9, the image data of the medicine 17 is displayed distinguishably per a pack (dosing time) unit for packing to the packing paper 40. Further, the image data of the medicines 17 displayed per each packing unit is rearranged in a predetermined order of the type of medicines 17. A pharmacist can easily check the inspection results based on the displayed image data. If the medicines 17 are not properly dispensed as a result of inspecting the medicines, it is preferable to display an error indication by changing the color of the image of such a medicine 17 on the touch panel 9, or by allowing the image of such a medicine 17 to flicker on the touch panel 9.

By way of example, FIG. 5B shows an example of an inspection result screen which is displayed after performing the medicine inspection process with regard to the prescription data shown in FIG. 5A. In this example, error locations are indicated by marking oblique lines to relevant cells, but indication symbols become red in practice. For example, a dosage to be taken in a daytime is two tablets of medicine A (○), one tablet of medicine B (Δ), and one tablet of the medicine C (□). And, the daytime dosage is displayed as ○, ○, Δ, □ in a predetermined order. In a daytime on the sixth day, the medicine A (○) is indicated by only one tablet, and the locations, which must be originally displayed as ○, ○, Δ, ○, are displayed as ○, –, Δ, □ (the error (–) is displayed in red) instead. Further, in a daytime on the seventh day, the medicine A (○), which must be packed for the daytime on the sixth day, is added, and the daytime on the seventh day is displayed as ○, ○, Δ, □, ○ (in red).

Further, the medicine 17 is displayed as a simplified figure such as "○" in FIG. 5B, but the image data of the medicine 17 is displayed in practice. Where the medicine is, for example, a tablet, it is preferable to display image data of both front and back surfaces of the tablet. For the purpose of better understanding of the inspection result, an extra column may be added and the inspection results may be displayed in such a column as "○" when proper, or as "x" when it is an error case. Further, the location of an error occurrence may be displayed in an easily distinguishable color such as red. Further, an enlarged image may be pop-up displayed by clicking the image data of the corresponding medicine 17 on the screen. Therefore, it is possible to perform a more reliable check of the medicine 17, in particular, the identification portion such as an engraving formed on the medicine.

In this way, the medicine inspection result is displayed per the pack (dosage) unit for the packing paper and in a predetermined order of medicine type. Thus, the user can very easily observe the medicine inspection result and easily determine the medicine inspection result. Moreover, since the location of error occurrence is displayed to be easily distinguishable from others, the user cannot mistakenly observe the location of error occurrence.

The medicines 17, which are completely inspected as described above, are sequentially discharged to and retained in the hopper 20. Then, the medicines 17 for one dosage (one dosing unit) are retained. If there is no problem in the inspection result, the medicines are packed into one relevant pack of the packing paper 40 on which relevant dosing information (the medicine name, dosing instructions, etc.) is printed by the printing unit 5. This packing may be performed automatically, or may be performed by displaying a confirmation button and being manipulated of the confirmation button. Therefore, in the state where the medicines are retained in the hopper 20, the medicines may be reliably supplied to and packed into one pack on which the corresponding printing has been performed. Further, if a problem occurs in the inspection result, one relevant pack may be printed to the effect that an error occurs. Further, if the relevant pack is already printed, the printing of error occurrence may be performed on the packing paper 40 subsequent to said relevant pack.

The present invention is not limited to the configurations described in the above-described embodiments but may be variously modified. It is preferable to form supply paths of the medicines 17 within a closed space. In short, the supply paths may be configured such that a user cannot directly manipulate the supply paths from the outside. This makes it possible to reliably prevent mixture of foreign substances including other medicines 17, whereby it is possible to further enhance the accuracy of the inspection before packing.

In the foregoing embodiment, the medicine inspection unit 4 is comprised of the medicine separation part 21 shown in FIG. 2 and the medicine imaging part 22 shown in FIG. 3, but the medicine inspection unit may be configured as described below. Further, the medicine separation part 21 and the medicine imaging part 22 may be freely combined between those described in the foregoing embodiment and the below-described embodiments. Further, the medicine separation part 21 is not necessarily required. By way of example, the medicine imaging part 22 may include a configuration capable of reliably transferring the medicines 17 one by one to an imaging position.

Figure 6:
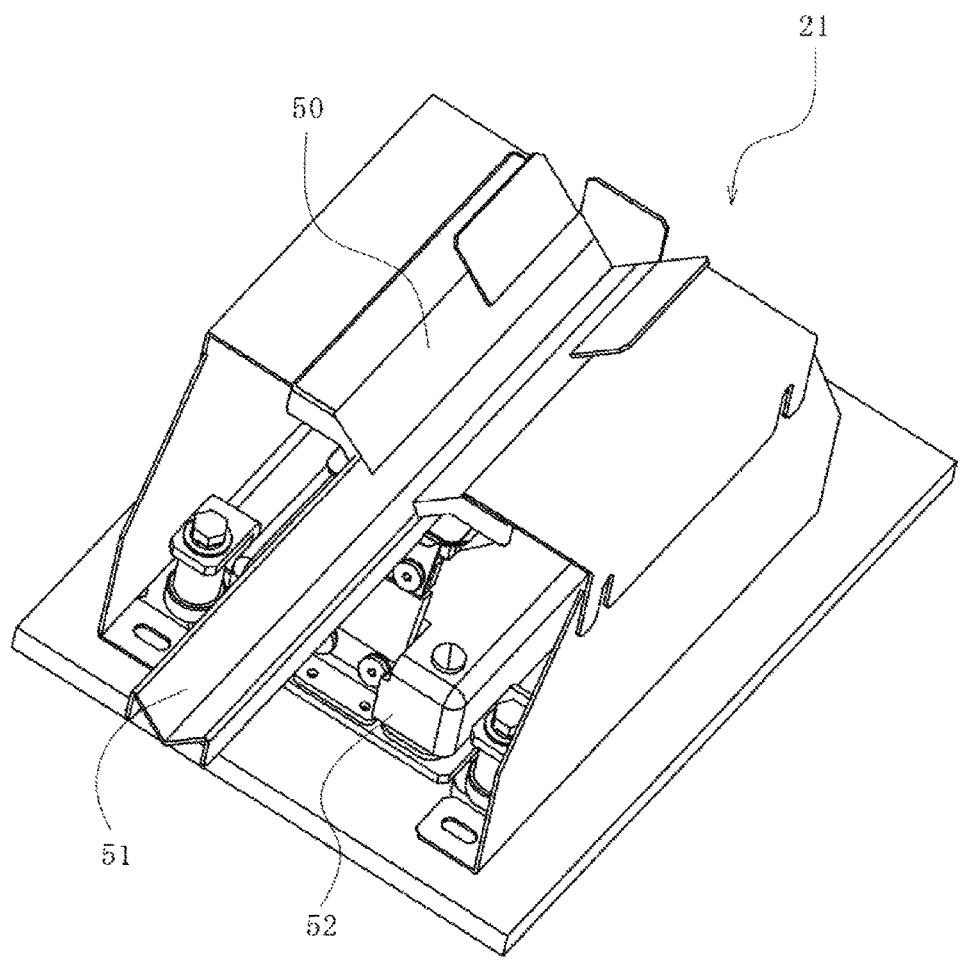
FIG. 6 is a perspective view showing another example of the medicine separation part shown in FIG. 2A.

The medicine separation part 21 may be configured as shown in any one of FIGS. 6 to 9. The medicine separation part shown in FIG. 6 is configured such that vibration is applied to the supplied medicine 17 and the medicine 17 is rotated while being transferred along a V-shaped transfer path. The transfer path is comprised of a first groove member 50 and a second groove member 51 connected to the first groove member. The first groove member 50 and the second groove member 51 are gradually inclined downwardly toward a leading end. Further, the first groove member 50 and the second groove member 51 are vibrated by a vibration generating device 52. In this case, a piezoelectric element is used in the vibration generating device 52. The piezoelectric element is disposed at a position offset from a center line of the second groove member 51. Therefore, it is possible to align the supplied medicines 17 in line while rotating the supplied medicines 17 with respect to an axis parallel to the center line of the second groove member 51, and to reliably transfer the medicines one by one.

Figure 7:
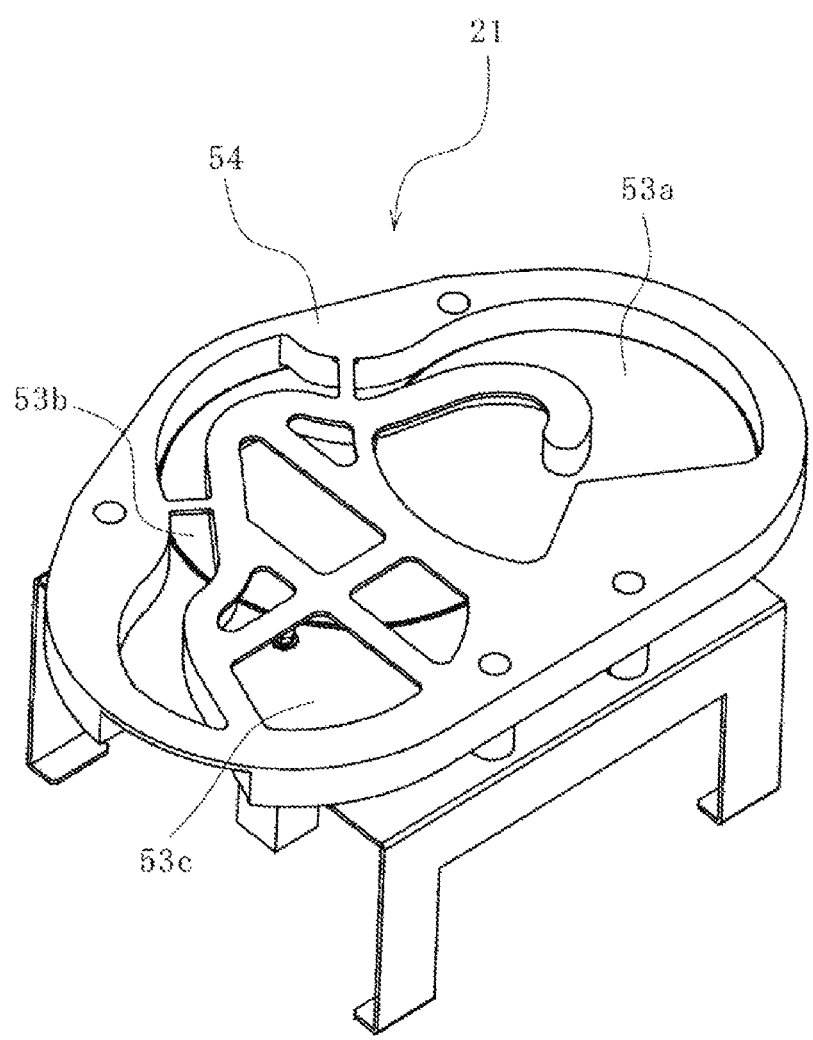
FIG. 7 is a perspective view showing yet another example of the medicine separation part shown in FIG. 2A.

The medicine separation part shown in FIG. 7 includes three rotating plates 53a, 53b and 53c. A first rotating plate 53a located at an uppermost position is set at a slowest rotation speed. A second rotating plate 53b is disposed below and vertically adjacent to the first rotating plate 53a while partially overlapping with the first rotating plate. A rotation speed of the second rotating plate is faster than that of the first rotating plate 53a. A third rotating plate 53c is disposed below and vertically adjacent to the second rotating plate 53b while partially overlapping with the second rotating plate. The third rotating plate is set at a highest rotation speed. Further, a guide member 54 is disposed above the rotating plates 53a, 53b and 53c, regulating the direction of the medicine 17, which is transferred by the rotation of the rotating plates 53a, 53b and 53c.

According to this configuration, the medicines 17 supplied onto the first rotating plate 53a are transferred onto the second rotating plate 53b due to the rotation of the first rotating plate while being guided by the guide member 54. Since the rotation speed of the second rotating plate 53b is faster than that of the first rotating plate 53a, the spacing between the transferred medicines 17 is widened. The medicines 17 are transferred onto the third rotating plate 53c having the faster rotation speed, and are transferred while the spacing is further widened. Therefore, it is possible to reliably transfer the medicines one by one. In this case, by disposing a shutter or the like (not shown) between the medicines 17 with the widened spacing, it is possible to reliably prevent the medicine 17 located at an upstream side in the rotation direction from being discharged.

Figure 8:
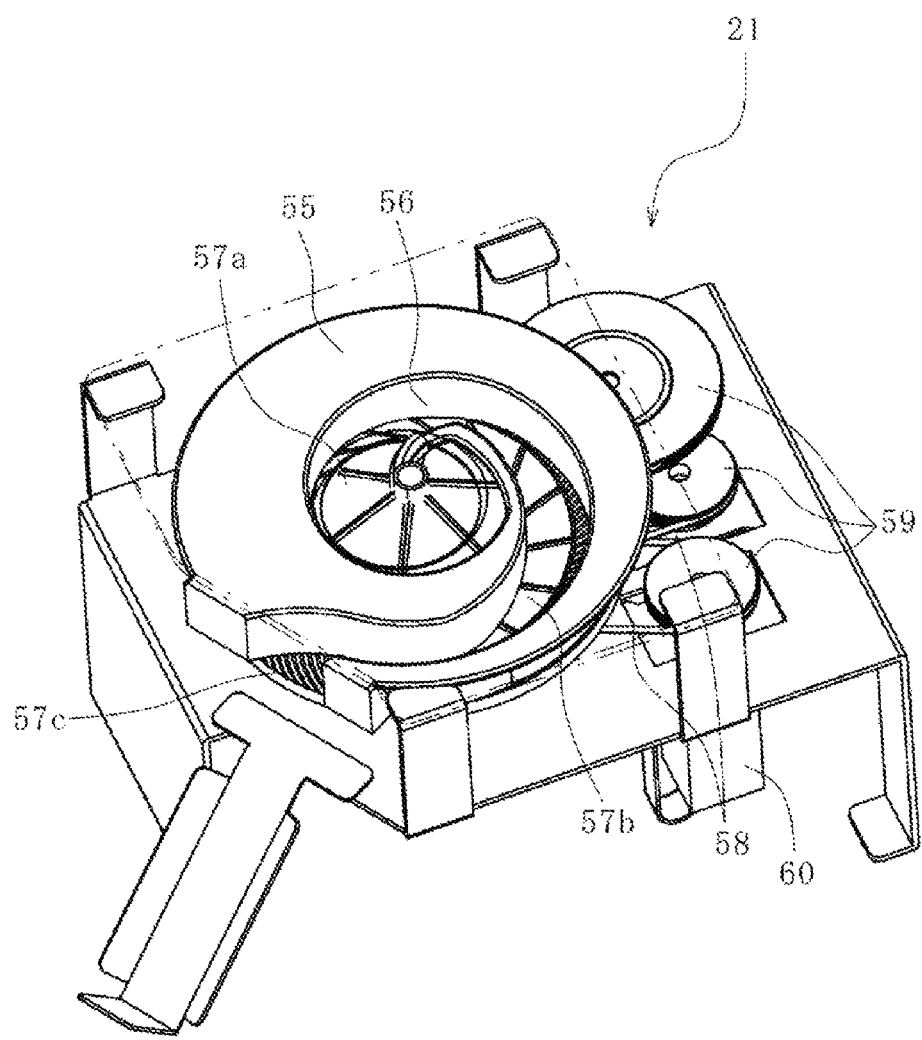
FIG. 8 is a perspective view showing a further example of the medicine separation part shown in FIG. 2A.

In FIG. 8, a spiral medicine passage 56 is formed by a guide member 55 below a ceiling plate shown by a two-dot chain line. A bottom surface of the medicine passage 56 is comprised of three rotating bodies 57a, 57b and 57c disposed from a central portion in a radially outward direction. The rotating bodies 57a and 57b are formed in a conical shape, and the rotating body 57c is formed in a flat donut shape. The annular second rotating body 57b is disposed at an outer periphery of the first rotating body 57a and the annular third rotating body 57c is disposed at an outer periphery of the second rotating body. The rotating bodies 57a, 57b and 57c are rotated and driven by respective individual motors 60 (only one is shown) through belts 58 and pulleys 59. The rotating bodies are set such that the farther they are located in a radial direction, the faster their rotation speeds become.

According to this configuration, the medicines 17 supplied to a central portion are moved radially and outwardly along the spiral medicine passage 56 due to the rotation of the first rotating body 57a, and then reach the second rotating body 57b. Since the rotation speed of the second rotating body 57b is faster than that of the first rotating body, the spacing between the medicines 17 is widened and the medicines then reach the third rotating body 57c. Since the rotation speed of the third rotating body 57c becomes faster, the spacing between the medicines 17 is further widened. Finally, the medicines are reliably discharged one by one at an outlet of the medicine passage 56.

Figure 9:
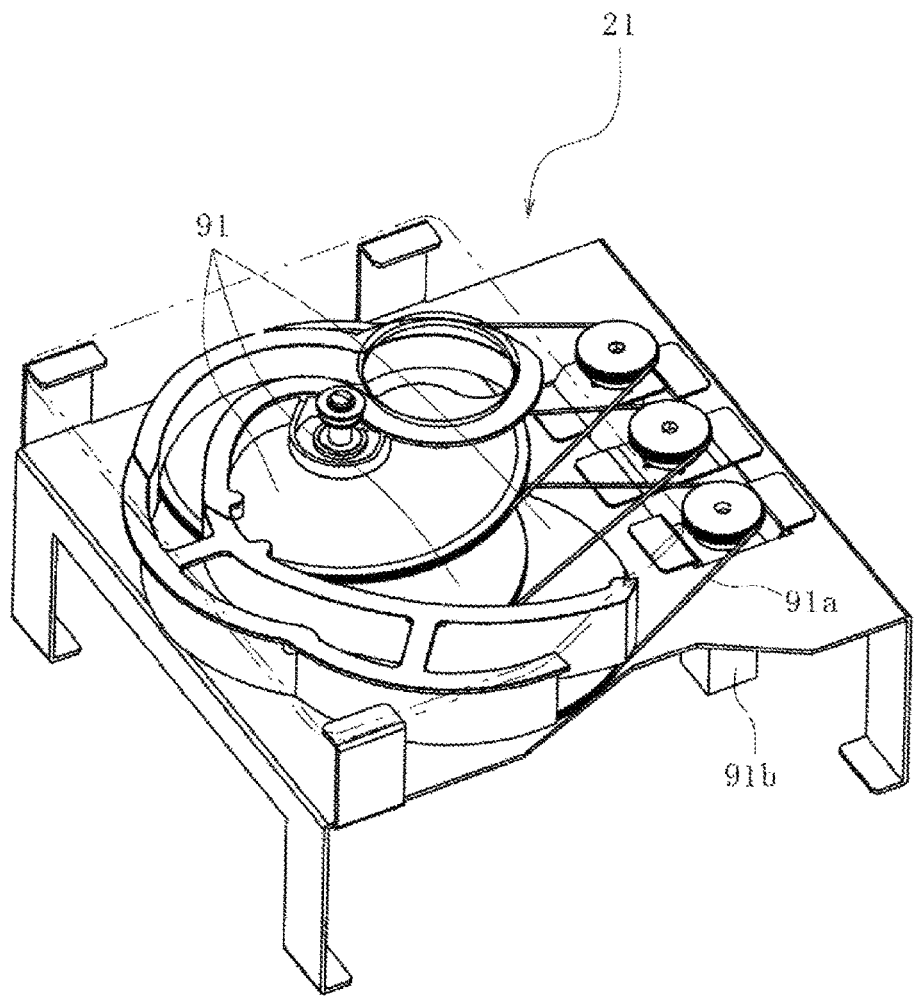
FIG. 9 is a perspective view showing a still further example of the medicine separation part shown in FIG. 2A.

In FIG. 9, similar to the configuration shown in FIG. 7, three circular plates 91 are disposed as being offset from one another. A belt 91a is wound around an outer periphery of each of the circular plates 91 such that a drive force from a motor 91b is transmitted to each of the circular plates.

Figure 10:
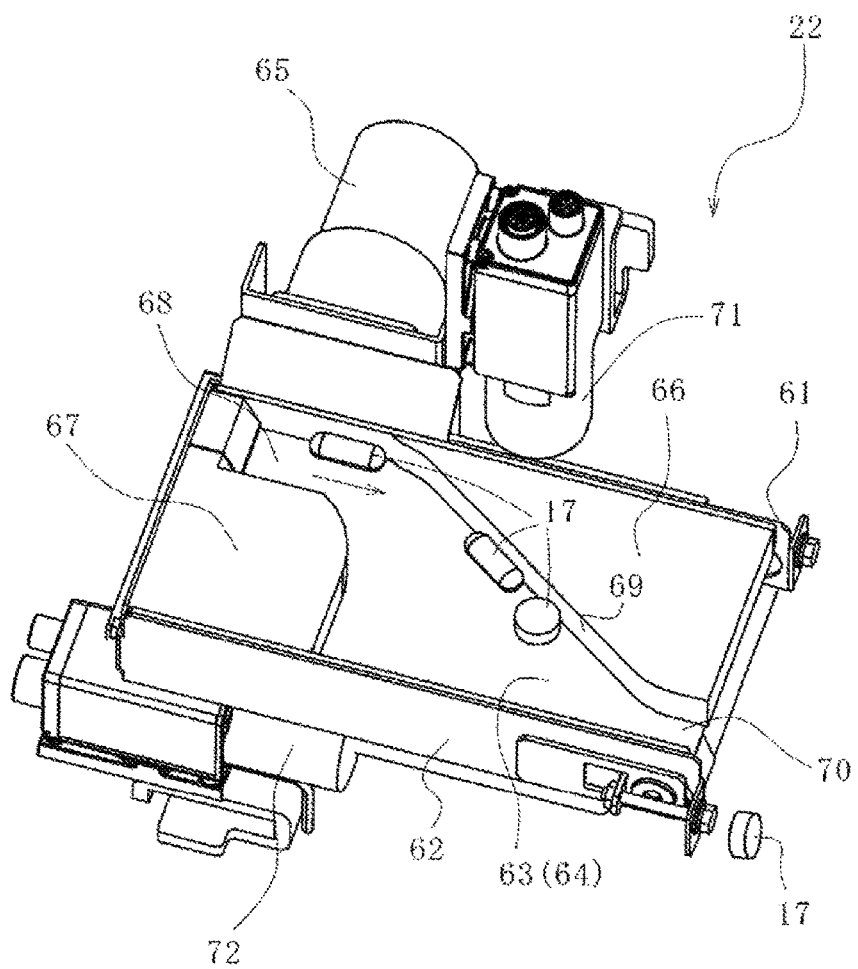
FIG. 10 is a perspective view showing another example of the medicine imaging part shown in FIG. 3A.
Figure 11:
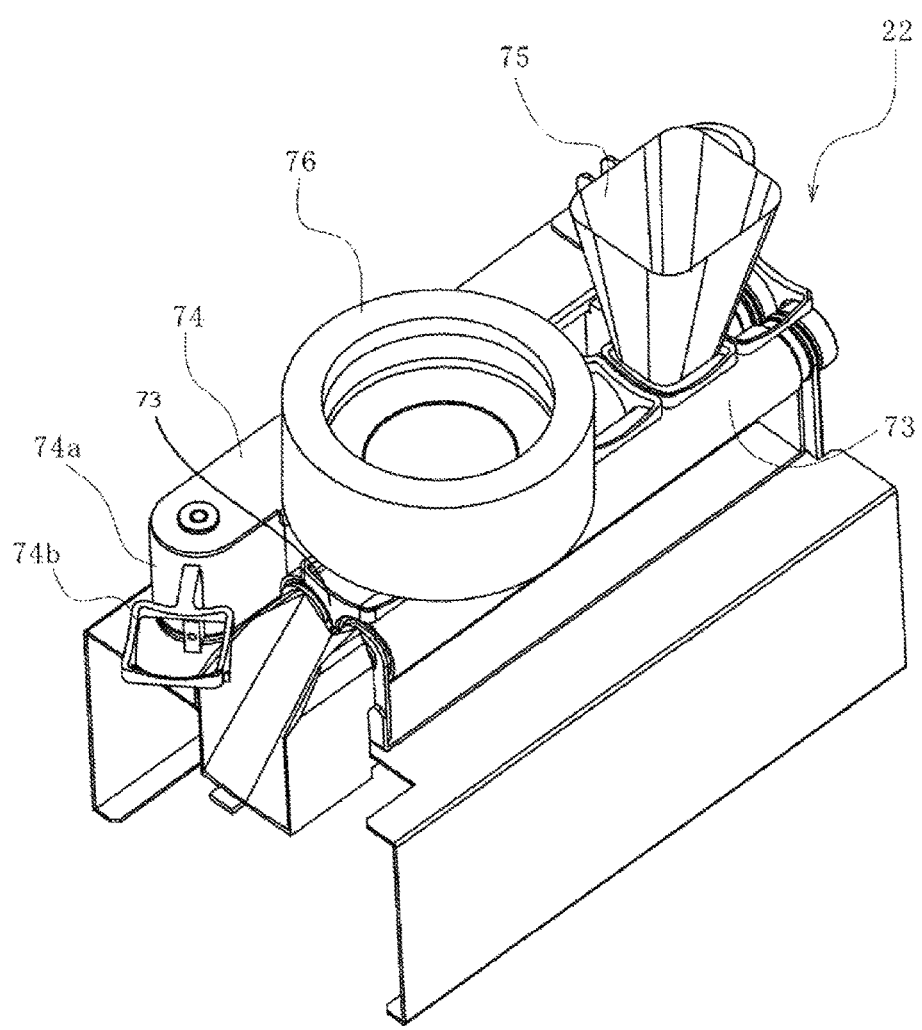
FIG. 11 is a perspective view showing yet another example of the medicine imaging part shown in FIG. 3A.
Figure 12:
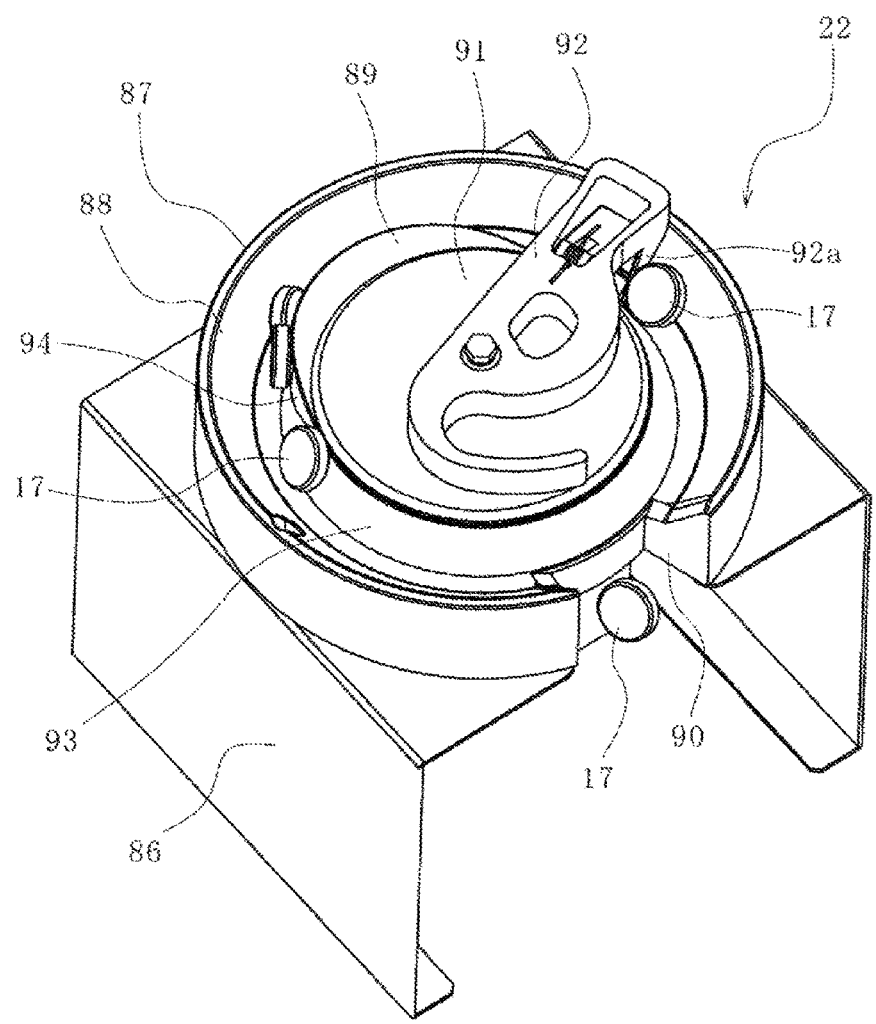
FIG. 12 is a perspective view showing a further example of the medicine imaging part shown in FIG. 3A.

The medicine imaging part 22 may be configured as shown in any one of FIGS. 10 to 12. The medicine imaging part shown in FIG. 10 includes a conveying part 64 wherein rollers (not shown) are rotatably disposed at a predetermined spacing at a first side plate 61 and a second side plate 62 disposed at a predetermined spacing and a belt 63 is wound around and between the rollers. A drive force of a motor 65 is transmitted to one of the rollers through a gear. Therefore, the medicines 17 supplied onto the belt 63 are conveyed in an arrow direction shown in FIG. 10 (in a direction directed from a left inclined upper position toward a right inclined lower position). A first guide member 66 is in an inner surface of the first side plate 61, and a second guide member 67 is in an inner surface of the second side plate 62. A supply space 68 for supplying the medicines 17 is formed between the first guide member 66 and the second guide member 67. The first guide member 66 has a slant surface 69 that gradually protrudes from the supply space toward the second side plate 62. A discharge passage 70 is formed between the front of the slant surface and the second side plate 62.

On the way of the conveyance path along the slant surface 69, a first imaging part 71 is disposed on an upper side. Therefore, in case of the capsule-shaped medicine 17, the identification portion 17a such as an engraving is visible from above and the identification portion 17a can be imaged by the first imaging part 71. A second imaging part 72 capable of imaging the medicine 17 dropping from the discharge passage 70 is disposed below the belt 63. If the medicine 17 conveyed along the slant surface 69 of the first guide member 66 is in the shape of a disc or the like, it is difficult to invert the medicine on the belt 63 and the first imaging part 71 may not photograph both surfaces of the medicine. In the configuration of FIG. 10, although the medicine has a disc shape, the first imaging part 71 can image the front surface of the medicine 17 and the second imaging part 72 can image the back surface of the medicine 17.

According to this configuration, if the motor 65 is driven to rotate the belt 63, the medicines 17 supplied to the supply space 68 is conveyed in the arrow direction and come into contact with the slant surface 69. Since the slant surface 69 intersects with a conveyance direction of the belt 63, the medicines 17 are conveyed while being in slide contact with the slant surface 69. Therefore, in case of the capsule-shaped medicine, the medicine is conveyed while being rotated around its longitudinal axis, and the first imaging part 71 can image the identification portion 17a such as an engraving. On the other hand, in case the medicine 17 has a disc shape or the like, the medicine cannot be brought into a state where the medicine is rotated during being conveyed along the slant surface 69 and the back surface of the medicine can be imaged by the first imaging part 71. Accordingly, the front surface of the medicine 17 is imaged by the first imaging part 71, and the back surface of the medicine 17 is imaged by the second imaging part 72 when the medicine falls from the discharge passage 70.

The medicine imaging part shown in FIG. 11 includes a pair of juxtaposed rotating rollers 73 and a conveyer part 74 for conveying the medicines 17, which are supplied onto the rotating rollers 73, along the rotating rollers 73. The rotating rollers 73 are synchronously rotated in the same direction by a motor (not shown). Therefore, the supplied medicines 17 are rotated. The conveyer part 74 includes a belt 74a disposed along the rotating roller 73. A rectangular frame-shaped frame body 74b is provided in and integrated with the belt 74a along the conveyance direction of the belt. A hopper 75 for supplying the medicines is provided at one end side of the rotating roller 73. Further, the medicine illuminating part 76 described in the above-described embodiment is disposed at the other end side of the rotating roller 73. The imaging part may be disposed above the medicine illuminating part 76 to photograph the medicine 17 illuminated by the medicine illuminating part 76.

According to this configuration, the medicine 17 supplied through the hopper 75 is retained in a receiving concave portion formed by the pair of rotating rollers 73 and the frame body 74b. Thus, by circulatively moving the belt 74a, the frame body 74b is moved on the rotating roller 73. Therefore, the medicine 17 retained in the receiving concave portion is conveyed from the one end side toward the other end side on the rotating roller 73 along with the movement of the frame body 74b. During the conveyance, the medicine itself is rotated by the rotation of the rotating roller 73. And, when the medicine reaches the imaging part, the identification portion 17a of the medicine 17 can be imaged.

In FIG. 12, a receiving saucer member 87 is disposed on an upper surface of a support table 86. The receiving saucer member 87 is comprised of an outer peripheral portion 88 and a conical portion 89 formed with an annular groove therein.

The outer peripheral portion 88 is configured such that its inner peripheral surface is an inclined surface gradually inclined downwardly from an outer periphery toward inside. A portion of the outer peripheral portion 88 is cutout to form a discharge opening 90. A circular plate 91 is disposed on the conical portion 89 and a guide member 92 is attached to the circular plate.

The circular plate 91 and the guide member 92 are rotated by the driving of a motor (not shown). A leading end of the guide member 92 forms a pressing portion located within the annular groove of the receiving saucer member 87, and moves the medicine 17, which is supplied to the annular groove, in a circumferential direction.

An outer peripheral surface of the conical portion 89 includes a first inclined surface 93 and a second inclined surface 94. The first inclined surface 93 is gradually inclined in a radially inward direction from below toward above. The second inclined surface 94 is formed opposite the discharge opening 90. The second inclined surface 94 is formed such that its inclination angle is gradually vertically directed from the first inclined surface 93, and then is gradually inclined in a radially outward direction from below toward above, and thereafter is changed again in an opposite direction to allow the second inclined surface to meet the first inclined surface 93. In other words, the first inclined surface 93 is formed in a circumferential direction (the conveyance direction of the medicine 17) from the discharge opening 90, and then the second inclined surface 94 with the gradually changing inclination angle is connected to the first inclined surface 93, and then the first inclined surface 93 is connected to the second inclined surface 94.

According to this configuration, if the medicine 17 is supplied to the annular groove of the receiving saucer member 87, the medicine 17 is first placed on the first inclined surface 93 and is brought into a state where one surface of the medicine is visible from above. Thus, said one surface of the medicine 17 is imaged by the camera (not shown). Subsequently, the guide member 92 is rotated by the driving of the motor, and the pressing portion 92a of the guide member moves the medicine 17 in the circumferential direction along the first inclined surface 93. The medicine 17 which is being moved along the first inclined surface 93 gradually changes its inclination angle on the second inclined surface 94 and is inverted from the second inclined surface 94 toward the inclined surface of the outer peripheral portion 88 during the movement of the medicine. When the medicine 17 is brought into a state where the other surface of the medicine is visible, the other surface is imaged by the camera (not shown).

Figure 13:
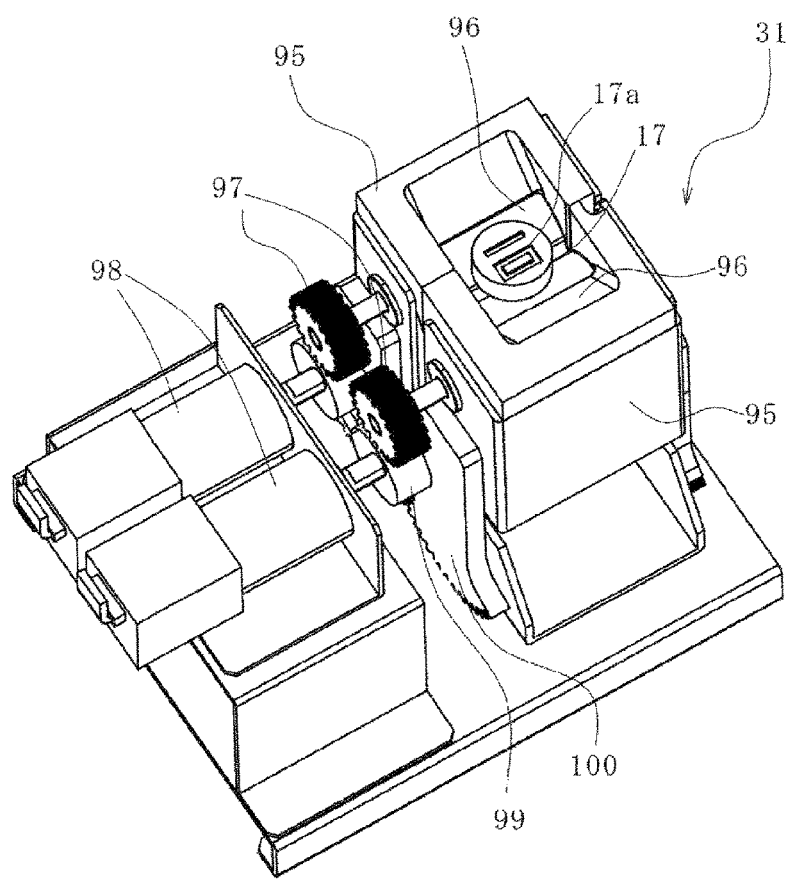
FIG. 13 is a perspective view showing another example of the medicine holding part shown in FIG. 3A.

FIG. 13 shows a medicine holding part having the same configuration as that of the medicine holding part 31 shown in FIG. 3A. That is, rotating rollers 96 are rotatably supported by a pair of frame bodies 95, respectively. A driven gear 97 is integrated with a rotating shaft of each of the rotating rollers 96, and a drive gear 99 integrated with a rotating shaft of each of drive motors 98 is in mesh with the driven gear. Therefore, if the drive motors 98 are driven, the rotating rollers 96 are rotated in the same direction through the drive gears 99 and the driven gears 97, and the medicine 17 placed on the rotating rollers is rotated. A pair of opening/closing gears 100 meshing with each other are disposed at end surfaces of the frame bodies 95 (the surfaces from which the rotating shafts of the rotating rollers 96 protrude), respectively. Although not shown in the figures, a gear provided at a rotating shaft of a motor is in mesh with one of the pair of the opening/closing gears 100, and the power of the motor (not shown) is transmitted to the opening/closing gears. Therefore, the held medicine 17 can fall by spacing the frame bodies apart from each other through the opening/closing gears 100 and then forming a gap between the rotating rollers 96.

What is claimed is:

1. A medicine dispensing device, comprising:
    a plurality of medicine cassettes configured to dispensably receive a medicine or a manual distribution medicine supply device that has a plurality of cells to which a medicine is distributed;
    a printer configured to print a dosing information included in a prescription data on a packing paper;
    a medicine packing mechanism to which the packing paper having the dosing information printed by the printer is supplied, wherein the medicine packing mechanism is configured to pack the medicine dispensed from the medicine cassette or the manual distribution medicine supply device one pack at a time based on the prescription data;
    an image reader configured to read an identification portion from the medicine dispensed from the medicine cassette or the manual distribution medicine supply device before the medicine packing mechanism packs the medicine into the packing paper having the dosing information printed by the printer; and
    a controller configured to perform an inspection process based on
        the identification portion read by the image reader, and
        a medicine information included in the prescription data,
    wherein the medicine is dispensed from the medicine cassette or the manual distribution medicine supply device to the image reader, and
    wherein the medicine, whose identification portion is read by the image reader, is discharged from the image reader to the medicine packing mechanism.

2. The medicine dispensing device of claim 1, wherein the image reader comprises:
    a medicine rotation mechanism configured to rotate the medicine to bring the identification portion into a state where the identification portion can be imaged; and
    a medicine imaging device configured to image the medicine rotated by the medicine rotation mechanism together with the identification portion.

3. The medicine dispensing device of claim 2, further comprising a data storage device configured to store a medicine information including the identification portion formed on the medicine received in each of the medicine cassettes,
    wherein the controller is configured to perform the inspection process by
        reading the identification portion from the medicine imaged by the medicine imaging device,
        extracting relevant medicine information from the data storage device based on the read identification portion, and
        comparing the extracted medicine information with the medicine information included in the prescription data.

4. The medicine dispensing device of claim 2, further comprising a display configured to display an image data of the medicine imaged by the medicine imaging device,
    wherein the controller is configured to cause the image data of the medicine imaged by the medicine imaging device to be displayed by the display such that the image data of the medicine imaged by the medicine imaging device is distinguishable per one pack.

5. The medicine dispensing device of claim 4, wherein the controller is configured to rearrange the image data of the medicine displayed by the display in a predetermined order of medicine type.

6. The medicine dispensing device of claim 2, wherein
    a path from the medicine cassette or the manual distribution medicine supply device to the medicine packing mechanism is formed as a closed space, and
    the medicine imaging device is disposed in the closed space.

7. The medicine dispensing device of claim 2, further comprising a medicine separation mechanism configured to cause the medicine from the medicine cassette or the manual distribution medicine supply device to be supplied one by one to a position where the medicine are imaged by the medicine imaging device.

8. The medicine dispensing device of claim 2, wherein the medicine rotation mechanism comprises:
    a pair of juxtaposed rollers, and
    a motor and gear combination configured to synchronize both of the rollers and to rotate both of the rollers in the same direction.

9. The medicine dispensing device of claim 1, wherein
    along a conveyance path of the medicine, the image reader is arranged between
        (a) the medicine cassette or the manual distribution medicine supply device, and
        (b) the medicine packing mechanism,
    the medicine cassette or the manual distribution medicine supply device is configured to dispense the medicine downstream along the conveyance path to the image reader, and the image reader is configured to dispense the medicine further downstream along the conveyance path to the medicine packing mechanism.

10. The medicine dispensing device of claim 6, wherein along said path, the image reader is arranged between
   (a) the medicine cassette or the manual distribution medicine supply device, and
   (b) the medicine packing mechanism,
the medicine cassette or the manual distribution medicine supply device is configured to dispense the medicine downstream along said path to the image reader, and
the image reader is configured to dispense the medicine further downstream along said path to the medicine packing mechanism.

* * * * *